Patented Oct. 7, 1941

2,257,914

UNITED STATES PATENT OFFICE 2,257,914

PURIFICATION OF ACID TREATED OILS

Sylvan R. Merley, Riverton, N. J., assignor to Cities Service Oil Company, New York, N. Y., a corporation of Pennsylvania No Drawing. Application December 7, 1939, Serial No. 307,987

6 Claims. (Cl. 196—41)

This invention relates to mineral oils and more particularly to a process of neutralization and removal of certain undesirable materials which are present in various products of mineral oil, after these products have been treated with sulfuric acid.

Acid treatment of the various products of mineral oil is a well-established practice, carried out primarily for the purpose of removing undesirable materials and stabilizing the product chemically. For example, gasolines and naphtha are acid treated to chemically stabilize unsaturated easily oxidizable gum-forming compounds, and to remove sulfur and color-forming materials; kerosenes are acid treated to remove gum-forming aromatic and unsaturated hydrocarbons, sulfur and color-forming materials; lubricating oils are acid treated to remove sulfur and materials which are easily oxidizable.

In this sulfuric acid treatment, the greatest part of these undesirable materials are precipitated out of the oils in the form of a solid sludge which may be separated from the remaining product; but at the same time part of the undesirable materials formed by the acid treatment do not precipitate out of the oil, but are dissolved in the oil.

Some of these unprecipitated materials can be removed by water-washing, or treatment by a sodium hydroxide solution. There is a group of materials, such as, alkyl sodium sulfonates, alkyl sodium sulfate-sulfonates, and dialkyl sodium sulfates, which are oil soluble and do not separate from the oil on water washing, but form oil soluble soaps when treated with alkaline solutions. These soaps are objectionable if not removed from the oil, as they are gum-forming materials.

In neutralizing with a sodium hydroxide solution, the concentration must be carefully controlled as polymerization of the oil results if the concentration of sodium hydroxide is high, which polymers are undesirable, due to their gum-forming characteristics.

It is the primary object of this invention to provide a process for neutralizing a sulfuric acid treated oil with a material which will not polymerize the oil and which will remove the undesirable oil soluble soaps that are formed during the neutralization.

The process consists broadly of treating the various sulfuric acid treated products of mineral oil with alkali metal sulfite solutions. In practicing this invention, a solution of 5% to 10% strength sodium sulfite is preferred; although other alkali metal sulfites and different strengths of sulfite solutions may be used.

After separating the sludge from the acid treated mineral oil product, the product is washed with water. This water wash will remove the free sulfuric acid, all water soluble materials, and some of the oil soluble materials. These oil soluble materials are removed by the water wash due to their solubility in the water soluble materials which are removed by the water wash. The oil is then ready to be treated with the sodium sulfite solution. The amount of sodium sulfite necessary to neutralize a definite quantity of acid treated oil is determined from the acidity of the oil, and an excess of about 50% over the theoretical calculated amount is used. The sulfite solution is mixed with the oil, and due to the fact that these two liquids are immiscible in each other, the mixture is thoroughly agitated until the oil is no longer acidic after it has separated from the sulfite solution. The mixture is allowed to settle, the oil is drawn off the top and then water washed until all the occluded sulfite solution is removed.

A sulfuric acid treated mineral oil product which has been thus treated with a sulfite solution has been found to be more color-stable and to have less gums and color-forming material than the same product neutralized with sodium hydroxide solution. This is accounted for by the fact that the pH of sodium sulfite solution is never very high; so that polymers are not formed on neutralization, such as are found when oils are neutralized with a strong sodium hydroxide solution. Further, the soaps which are formed on the neutralization of the alkyl sulfonates, alkyl sulfate-sulfonates, and dialkyl sulfates with sodium hydroxide, are more or less oil soluble, and are not easily removable from the oil. When a solution of sodium sulfite is used for neutralization, the soaps are removed in the excess sodium sulfite solution.

The term "sulfite" as used in the claims, is intended to include the normal sulfites and the acid sulfites unless otherwise specified.

Although the use of sulfite solution has been discussed with respect to sulfuric acid treated oils, it is equally applicable to the neutralization of any acid treated oil regardless of which acid was used. This has been found to be true due to the low pH of sulfite solution which prevents the formation of polymers in the neutralization process.

The invention having been thus described, what is claimed as new is:

1. A process for the neutralization of sulfuric acid treated mineral oils, and the removal of oil soluble soaps from the mineral oils without the use of caustic alkali solution, comprising a treatment of the acid treated oil with an excess of a solution of normal alkali metal sulfite, over the amount normally required to neutralize the acidity of the oil.

2. A process for the neutralization of sulfuric acid treated mineral oils, and the removal of oil soluble soaps from the mineral oils without the use of caustic alkali solution, comprising a treatment of the acid treated oil with an excess of a solution of normal sodium sulfite, over the amount normally required to neutralize the acidity of the oil.

3. The method of treating mineral oils comprising intimately mixing the mineral oil with sulfuric acid to polymerize hydrocarbon material therein, allowing the sludge to settle and separating the sludge from the acid treated oil, washing the oil with water and separating the water wash from the oil, then intimately mixing the oil with a dilute solution of sodium sulfite and separating the oil from the sulfite treating solution.

4. The method of treating mineral oils as defined in claim 3 wherein the acid treated oil is neutralized with a sodium sulfite solution of 5% to 10% concentration in an excess of at least 50% of the amount of sodium sulfite solution required to neutralize the acidity of the oil.

5. The process of refining mineral oils which have been treated with sulfuric acid and which contain undesirable dissolved hydrocarbon derivatives of sulfuric acid and in which process the treatment of the acid treated oil with caustic alkali solution is avoided thereby avoiding the formation of undesirable polymerized products normally formed from said sulfuric acid derivatives, which comprises treating the sulfuric acid treated oil with a solution of an alkali sulfite adapted to react with and dissolve said sulfuric acid derivatives without polymerization thereof, and separating the resulting refined oil from the alkali sulfite solution containing said undesirable sulfuric acid derivatives and reaction products thereof with said sulfite.

6. The process of refining mineral oils which have been treated with an acid and which contain undesirable dissolved hydrocarbon derivatives of the acid and in which process the treatment of the acid treated oil with caustic alkali solution is avoided thereby avoiding the formation of undesirable polymerized products normally formed from said acid derivatives, which comprises treating the acid treated oil with a solution of an alkali sulfite adapted to react with and dissolve said acid derivatives without substantial polymerization thereof, and separating the resulting refined oil from the alkali sulfite solution containing said undesirable acid derivatives and reaction products thereof with said sulfite.

SYLVAN R. MERLEY.